US005757385A

United States Patent [19]
Narayanaswami et al.

[11] Patent Number: 5,757,385
[45] Date of Patent: May 26, 1998

[54] METHOD AND APPARATUS FOR MANAGING MULTIPROCESSOR GRAPHICAL WORKLOAD DISTRIBUTION

[75] Inventors: Chandrasekhar Narayanaswami; Avijit Saha, both of Austin, Tex.

[73] Assignee: International Business Machines Corporation, Armonk, N.Y.

[21] Appl. No.: 629,500

[22] Filed: Jan. 30, 1996

Related U.S. Application Data

[63] Continuation of Ser. No. 286,711, Jul. 21, 1994.

[51] Int. Cl.$^6$ .................................................. G06F 15/80
[52] U.S. Cl. .................................................. 345/505; 395/675
[58] Field of Search .................................. 395/126–133, 395/501, 502, 505, 507, 515, 675; 345/24, 27, 28, 133, 185, 189, 203, 505, 501, 502, 507, 515

[56] References Cited

U.S. PATENT DOCUMENTS

| | | | |
|---|---|---|---|
| 4,967,392 | 10/1990 | Werner et al. | 395/505 |
| 5,220,650 | 6/1993 | Barkans | 395/505 |
| 5,287,438 | 2/1994 | Kelleher | 395/132 |
| 5,343,558 | 8/1994 | Akeley | 395/126 |
| 5,392,393 | 2/1995 | Deering | 395/505 |
| 5,408,606 | 4/1995 | Eckart | 395/163 |

FOREIGN PATENT DOCUMENTS 3177961   1/1991   Japan.

OTHER PUBLICATIONS

IEEE Computer Graphics and Applications Magazine, "Dynamic load balancing for parallel polygon rendering", S. Whitman, Jul. 1994, pp. 41–48.

Graham Rowan, "Real Images in real–time", Computer Graphics 88, pp. 13–23, Oct. 1988.

Anthony Reeves, "Region Growing on a Highly Parallel Mesh–Connected SIMD Computer", IEEE Computer Society Press, pp. 93–100, Oct. 1988.

Michael Palmer and Stephen Taylor, "Rotation Invariant Partitioning for Concurrent Scientific Visualization", Parallel CFD'94 Conference, p. 409–416, May 1994.

Tong–Yee Lee, C.S. Raghavendra, John B. Nicholas, "Load Balancing Strategies for Ray Tracing on Parallel Processors", IEEE Region Annual International Conference, pp. 177–181, 1994.

Marc H. Willebeek–LeMair, Anthony Reeves, Strategies for Dynamic Load Balancing on Highly Parallel Computers:, IEEE Transactions on Parallel and Distributed Systems, pp. 979–993, Sep. 1993.

*Computer Graphics Principles and Pratice*, Second Edition, Foley et al, Chapter 18, "Advanced Raster Graphics Architecture", S. Molnar et al, pp. 855–922.

*Primary Examiner*—Kee M. Tung
*Attorney, Agent, or Firm*—Volel Emile; Alan L. Carlson; Andrew J. Dillon

[57] ABSTRACT

An apparatus for utilizing multiple processors to render graphical objects for display including apparatus for storing in memory a list of pixel locations assigned to each of the processors, apparatus for scan converting each received graphical object into pixels, and each processor including apparatus for rendering graphical object pixels at pixel locations assigned to the processor. In addition, a method of utilizing multiple processors to render graphical objects for display including the steps of storing in memory a list of pixel locations assigned to each of the processors, scan converting each received graphical object into pixels, and each processor rendering graphical object pixels at pixel locations assigned to the processor.

18 Claims, 6 Drawing Sheets

METHOD AND APPARATUS FOR MANAGING MULTIPROCESSOR GRAPHICAL WORKLOAD DISTRIBUTION

This is a continuation of application Ser. No. 08/286,711, filed Jul. 21, 1994.

TECHNICAL FIELD

The present invention relates generally to computer graphics systems and more particularly to a method and apparatus for managing a graphical workload across multiple processors.

BACKGROUND ART

In computer graphics systems, it is desirable to render multiple objects into a frame buffer for display as quickly as possible. However, the rendering process has become more complex and computationally intensive as users demand more detailed results using more objects rendered more quickly, including providing realtime motion, while using more computationally intensive processing techniques such as color, texture, lighting, transparency and other rendering techniques. As a result, multiprocessing has been utilized to handle this ever increasing graphical workload.

Many techniques for utilizing multiple processors are described in pages 855 to 922 of "Computer Graphics Principles and Practice", second edition, 1990, by Foley, Van Dam, Feiner, and Hughes. For example, each object to be rendered may be assigned to a specific processor for processing including the use of a processor for each object in very high performance systems.

DISCLOSURE OF THE INVENTION

An apparatus for utilizing multiple processors to render graphical objects for display including apparatus for storing in memory a list of pixel locations assigned to each of the processors, apparatus for scan converting each received graphical object into pixels, and each processor including apparatus for rendering graphical object pixels at pixel locations assigned to the processor. In addition, a method of utilizing multiple processors to render graphical objects for display including the steps of storing in memory a list of pixel locations assigned to each of the processors, scan converting each received graphical object into pixels, and each processor rendering graphical object pixels at pixel locations assigned to the processor.

A further understanding of the nature and advantages of the present invention may be realized by reference to the remaining portions of the specification and the drawings.

BEST MODE FOR CARRYING OUT THE INVENTION

This disclosure describes an improved method and apparatus for managing a graphical workload such as rendering across multiple processors by pixel location or by display region. That is, a processor may process rendering of pixels for particular regions of a display or window based on various allocation techniques. These allocation techniques may be dynamic such that a particular pixel or display region may be processed by a first processor for a period of time and then rendered by a second processor for another period of time. This allows for great flexibility in managing the graphical workload across multiple processors.

Figure 1:
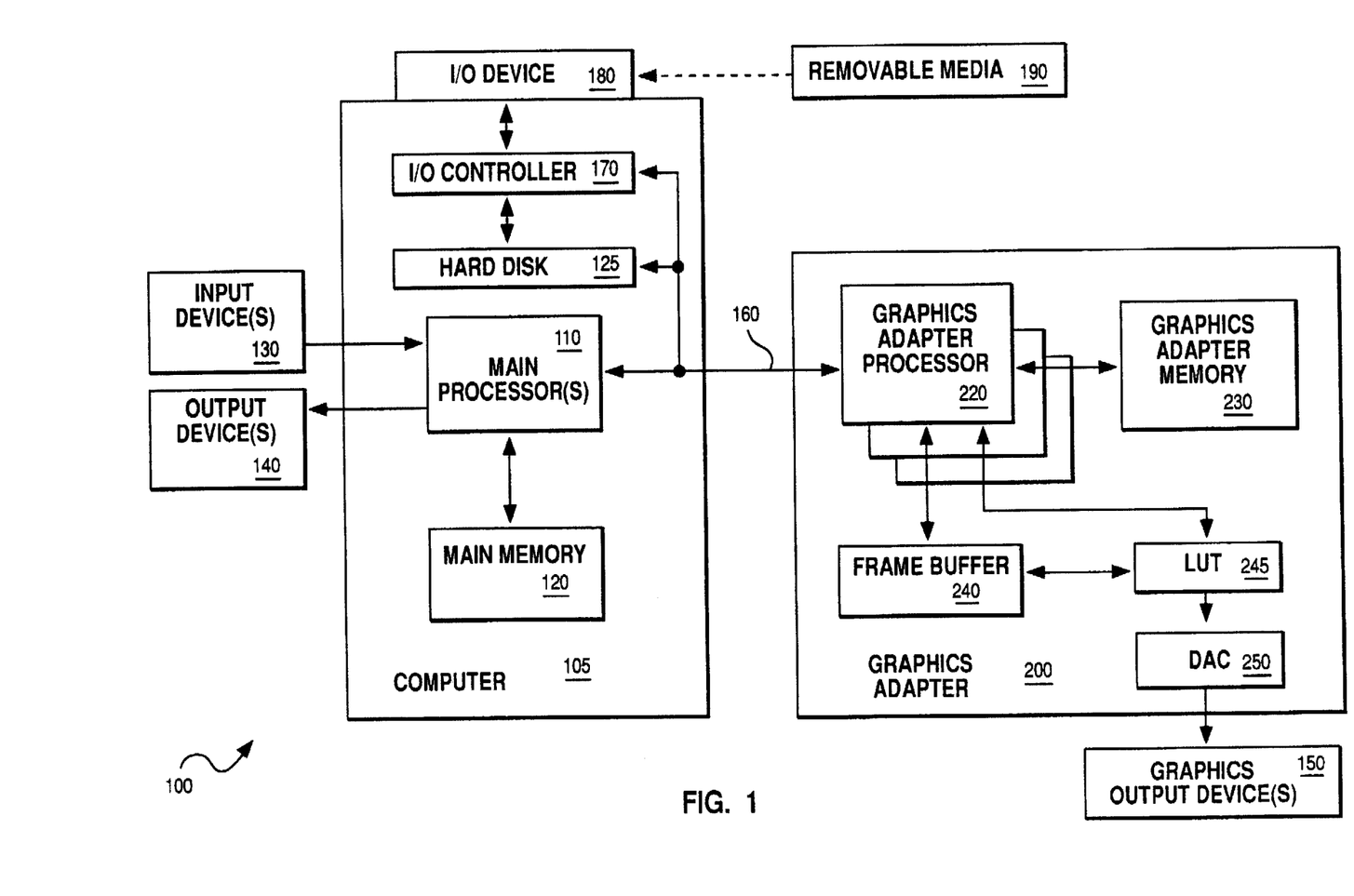
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc—read only memory) drive. Data is read from or written to the removable media by the I/O device under the control of the I/O device controller 170. The I/O device controller communicates with the main processor through across bus 160. Main memory 120, hard disk 125 and removable media 190 are all referred to as memory for storing data for processing by main processor(s) 110.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processors 220 coupled to a graphics adapter memory 230. The graphics processors in the graphics adapter then execute those instructions and updates frame buffer(s) 240 based on those instructions. Graphics processors 220 may be a pipeline of processors in series, a set of parallel processors, or some combination thereof, where each processor may handle a portion of a task to be completed. Graphic processors 220 may also include specialized rendering hardware for rendering specific types of primitives. Graphics memory 230 is used by the graphics processors to store information being processed, such as received object data, intermediate calculated data (such as a stencil buffer or partially rendered object data), and completed data being loaded into the frame buffer 240. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
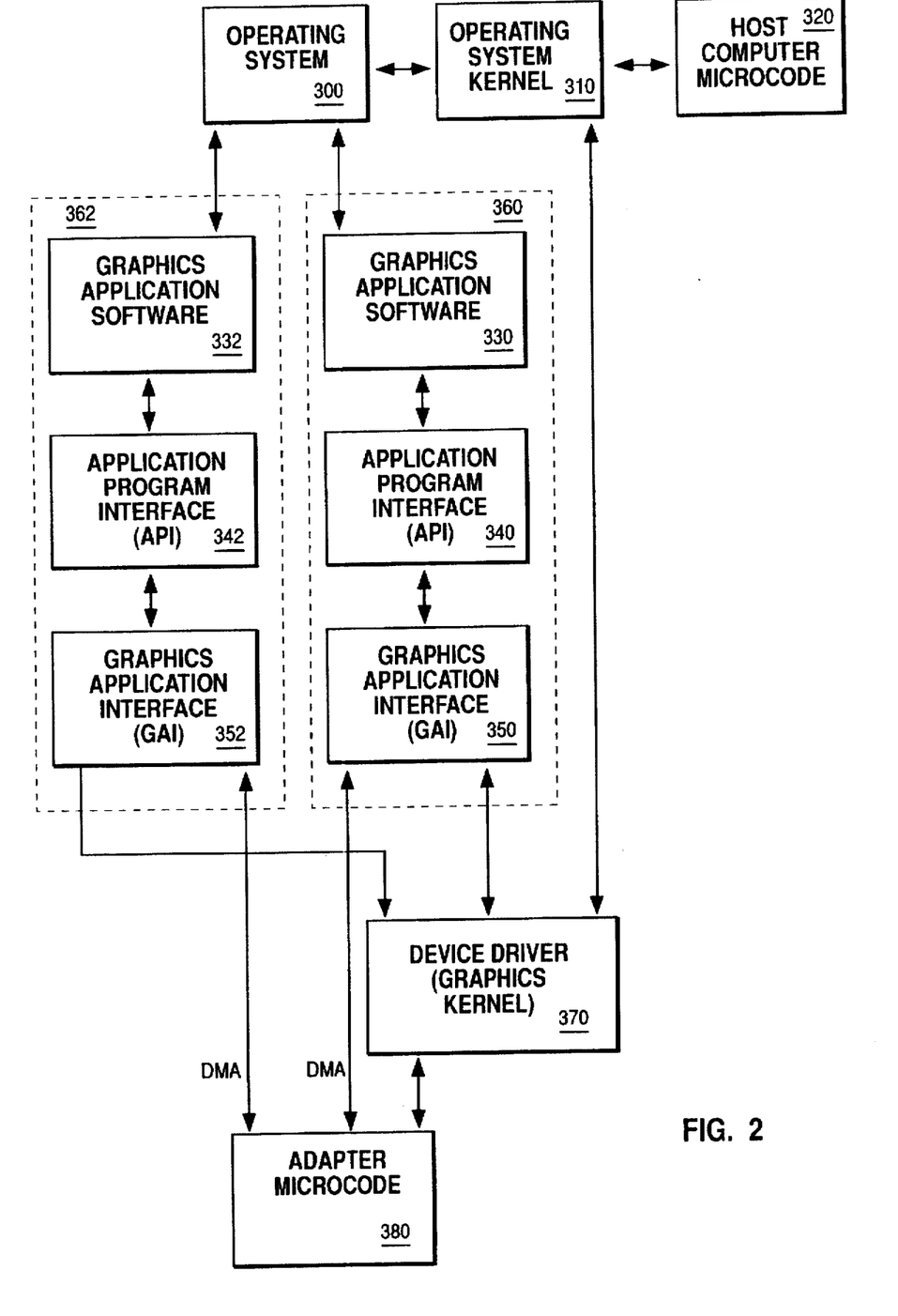
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window and the adapter microcode breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified.

The techniques of the present invention could be utilized in many locations such as the adapter microcode which is close to the adapter frame buffer. This approach would also be relatively quick and fairly easy to implement. In addition, the present invention could be applied in the graphics application software wherein the rendered image is also stored in system memory either prior to the image being rendered or subsequently by the graphics adapter passing the data back up to the graphics application software. This approach would probably be slower but would allow for utilization of this technique on preexisting graphics adapters. The present invention could also be implemented in hardware in the graphics adapter processor. This approach is extremely quick but may necessitate specialized hardware. As would be obvious to one of ordinary skill in the art, the present invention could be applied in many other locations within the host computer or graphics adapter.

Figure 3A:
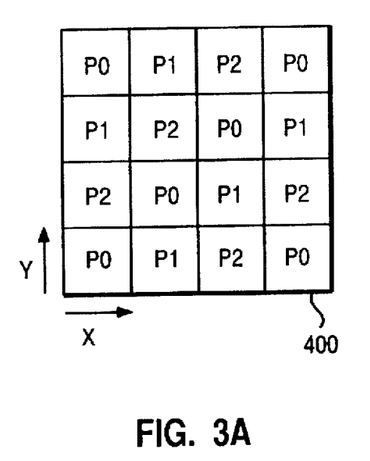
FIGS. 3A–3C show various ways a graphical workload can be distributed by pixel location according to a preferred embodiment of the invention.
Figure 3B:
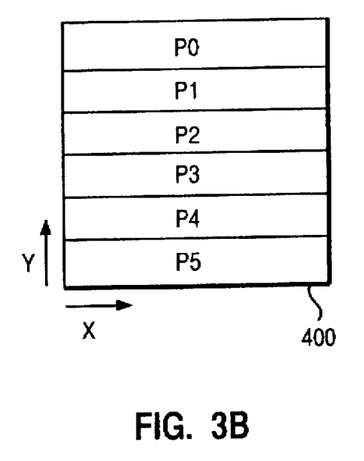
Figure 3C:
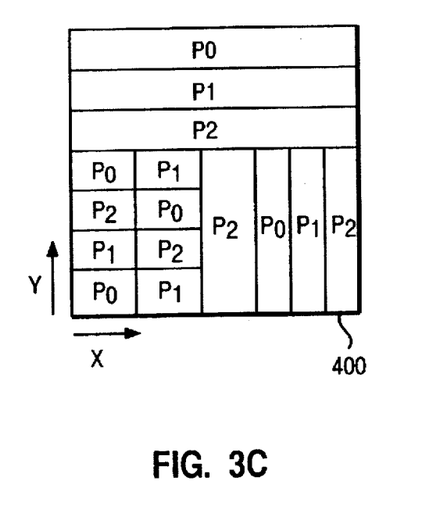

FIGS. 3A–3C show various ways a graphical workload can be distributed by pixel location according to a preferred embodiment of the invention. Each figure shows a window or display where certain regions are allocated to various processors for rendering pixels in those regions.

FIG. 3A shows a round robin approach for distributing the graphical workload. A display or window 400 may be divided into multiple regions of pixels that are distributed across multiple processors in a round robin fashion. In the present example there are sixteen regions and three processors P0, P1 and P2.

FIG. 3B shows a stripe allocation approach for distributing the graphical workload by region of pixels. A display or window 400 may be divided into multiple stripes where each processor is assigned one stripe. In the present example there are six stripes and six processors P0, P1, P2, P3, P4 and P5.

FIG. 3C shows a mixed allocation procedure where the processors may be assigned regions of pixels using various techniques. In the present example there are many regions allocated to three processors P0, P1 and P2. The mixed allocation approach allows the allocation to be optimized based on various parameters. For example, the breakdown and allocation of pixels or regions of pixels may be based on the number of objects in a particular areas of the display. The breakdown and allocation may also be based on the amount of workload each processor already has. The breakdown and allocation of pixels or regions of pixels may also be dynamic whereby the pixels may be reassigned to different processors over time based on various factors. In any approach, the present invention allows for great flexibility in distributing the workload.

Figure 4:
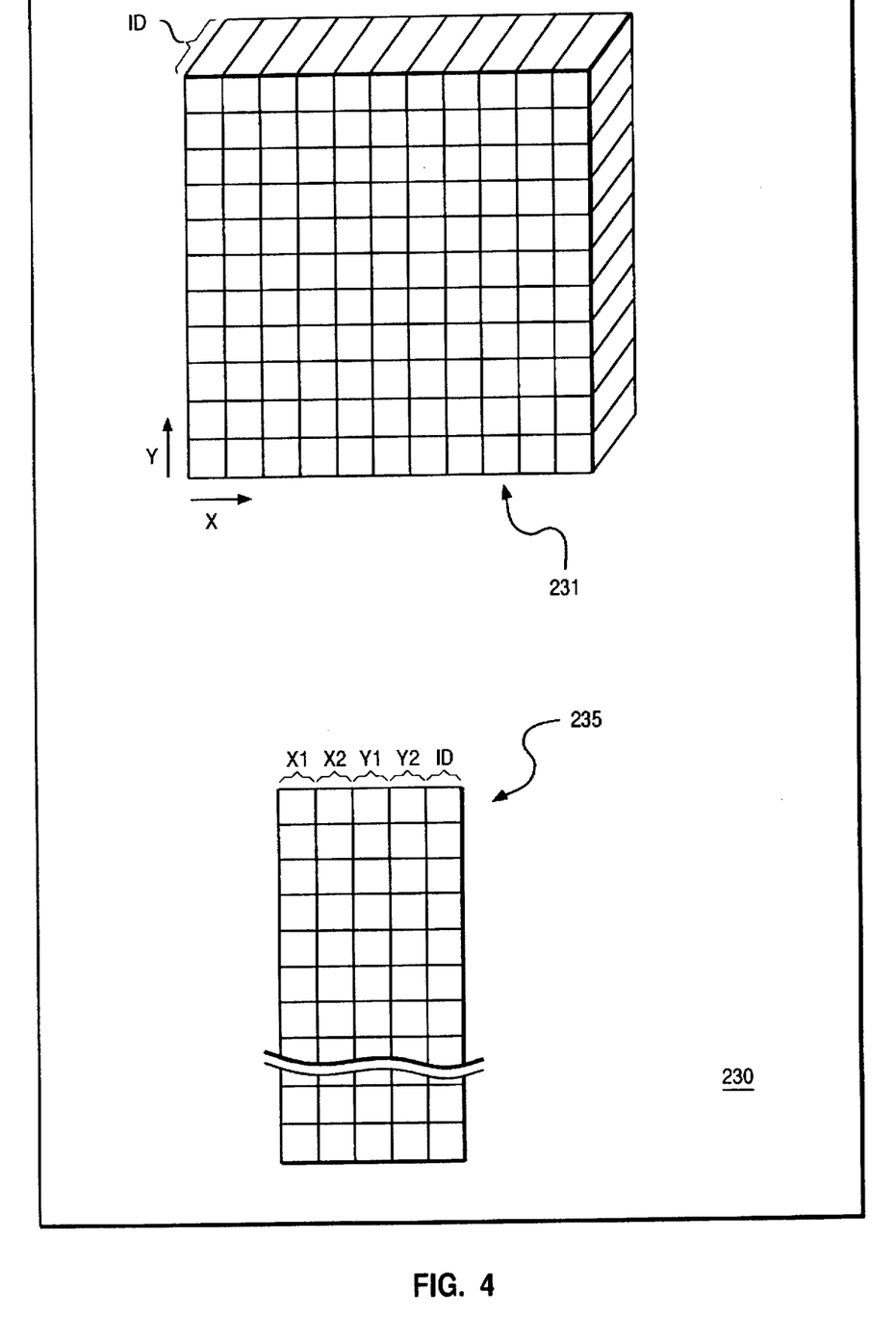
FIG. 4 is a block diagram illustrating data structures that may be used in the graphics adapter memory in the preferred embodiment of the invention.

FIG. 4 is a block diagram illustrating data structures that may be used in the graphics adapter memory 230 in the preferred embodiment of the invention.

A pixel ownership buffer 231 is used to store identifiers (IDs) of the processor that owns each pixel. That is, there is one entry corresponding to every pixel in the frame buffer, and that entry contains an identifier of the processor that handles processing for that pixel including rendering. These entries may be modified over time to dynamically manage the processor workload.

A region ownership list 235 may be used as an alternative to the pixel ownership buffer 231 described above. In this alternative, the region ownership list includes one entry for each region and may be fixed or variable length. Variable length would allow for greater flexibility in allocating regions but may he difficult to manage. Each entry includes five elements that describe the minimum X value (X1), the maximum X value (X2), the minimum Y value (Y1), the maximum Y value (Y2), and the identifier of the processor that owns the region. As a result, the size and location of the region is defined and ownership is established of the region. In another alternative embodiment, the size and location of the regions may be fixed such that only the identifier of the processor that owns the region may be displayed.

Figure 5:
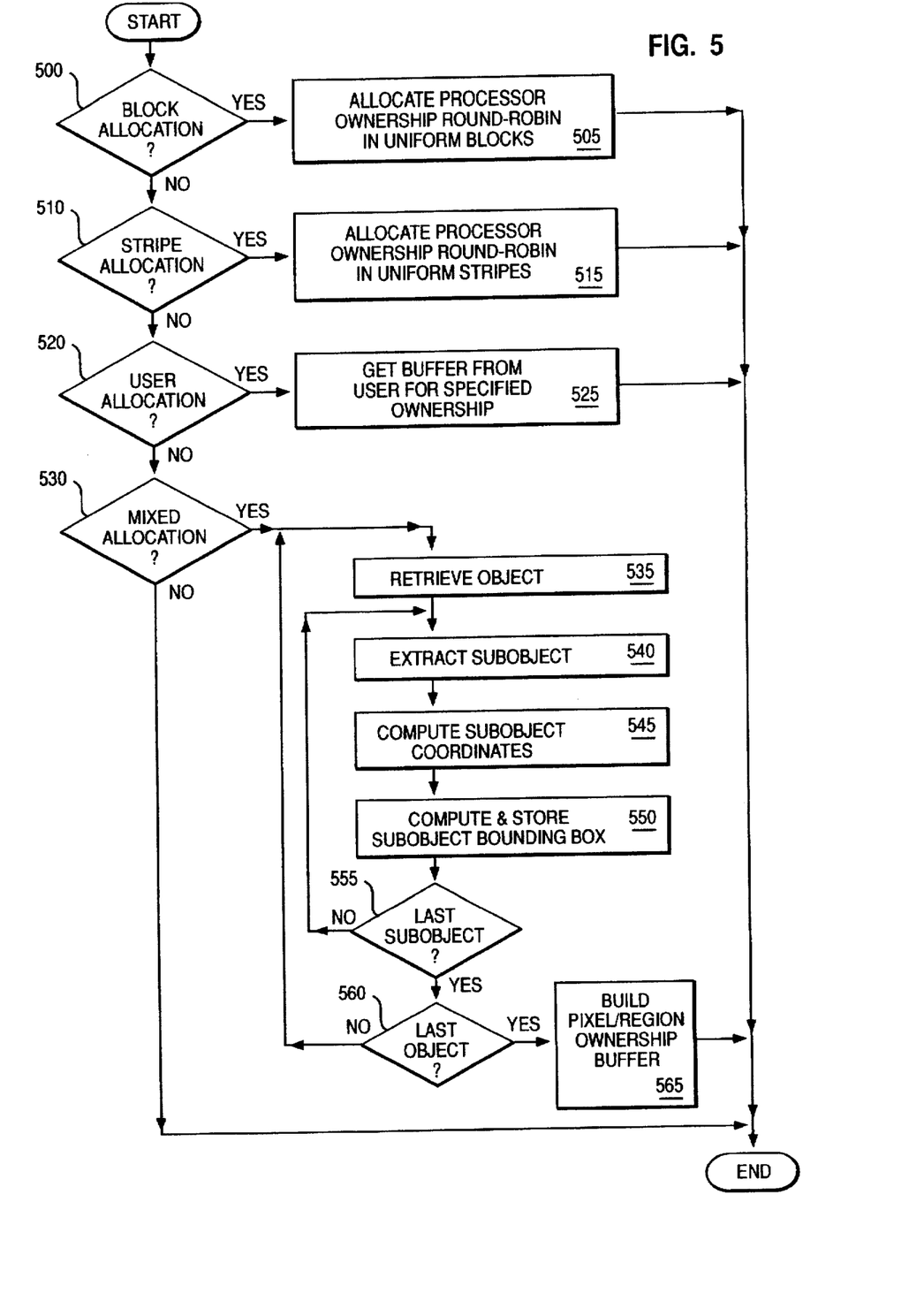
FIG. 5 is a flowchart illustrating a preferred method for generating a pixel ownership buffer or a region ownership list.

FIG. 5 is a flowchart illustrating a preferred method for generating a pixel ownership buffer or a region ownership list. This process may be executed at any time to establish processor ownership of regions or pixels. In addition, this process may be repeatedly executed to constantly optimize the allocation of the graphical workload.

In a first step 500, it is determined whether block allocation of the pixels may be performed. This type of allocation has the advantage of being simple and quick. If yes, then in step 505, the processor ownership is allocated in a round-robin fashion in uniform blocks of pixels or regions according to the preferred embodiment as shown in FIG. 3A. During this process, the data structures shown in FIG. 4 or their equivalents may be generated which indicate which processors own which pixels or regions. However, in alternative embodiments, the regions need not be uniform and may be allocated in some other manner other than round-robin. Upon completion of step 505, processing ends for this process until it is reexecuted. If no in step 500 above, then processing continues to step 510.

In step 510, it is determined whether stripe allocation of the pixels may be performed. This type of allocation also has the advantage of being simple and quick. If yes, then in step 515, the processor ownership is allocated in a round-robin fashion in uniform stripes of pixels or regions according to the preferred embodiment as shown in FIG. 3B. During this process, the data structures shown in FIG. 4 or their equivalents may be generated which indicate which processors own which pixels or regions. However, in alternative embodiments, the regions need not be uniform and may be allocated in some other manner other than round-robin. Upon completion of step 515, processing ends for this process until it is reexecuted. If no in step 510 above, then processing continues to step 520.

In step 520, it is determined whether the user (or an application program) may wish to allocate the pixels or regions. This type of allocation has the advantage of allowing the user or application programs to generate optimized ownership patterns that anticipate upcoming graphical workloads. If yes, then in step 525, a buffer or list is obtained from the user or application program for storage in the graphics adapter memory. Upon completion of step 525, processing ends for this process until it is reexecuted. If no in step 520 above, then processing continues to step 530.

In step 530, it is determined whether a mixed allocation of the pixels may be performed. This type of allocation has the advantage of being extremely flexible for optimizing allocation of pixel ownership. If no in step 530, then processing ends for this process until it is reexecuted. However, since no allocation has occurred, then a default or previous allocation continues to control which processors own which pixels or regions. If yes in step 530, then processing continues to step 535.

In step 535, an object to be processed is retrieved. In step 540, the object may be split into subobjects and a first one of the subobjects is extracted by generating or retrieving its vertices. This splitting process is particularly useful for handling three dimensional objects which have many faces, each face a subobject. In step 545, the window coordinates of the subobject are computed for processing. In step 550, a bounding box containing the subobject is calculated and stored. A bounding box is a region that contains the subobject and may have the maximum and minimum values for X, Y and Z coordinates in its boundary. The bounding box is preferably stored with other parameters that describe the object. In step 555, it is determined whether the last subobject for the given object has been processed. If not, then processing returns to step 540 for processing the next subobject. If yes, then processing continues to step 560 where it is determined whether the last object has been processed. If not, then processing returns to step 535 for processing the next object. If yes, then processing continues to step 565.

In step 565, the pixel ownership buffer or the region ownership list may be generated from all the previously calculated bounding boxes. In the preferred embodiment, the K-D tree method may be used to allocate the pixels or regions based on the distribution of the object bounding boxes in the display or window. The K-D method is a well known technique for allocating limited resources and is described in *Algorithm in Combinatorial Geometry*, H. Edelsbrunner, Springer-Verlag publisher, 1987. Of course, other optimization techniques may be utilized.

The above described steps 500, 510, 520 and 530 may be dynamically controlled. That is, they may be controlled by the user or an application program. In addition, they may be controlled by an optimization process that determines which is the optimum approach to use for a given situation.

Figure 6:
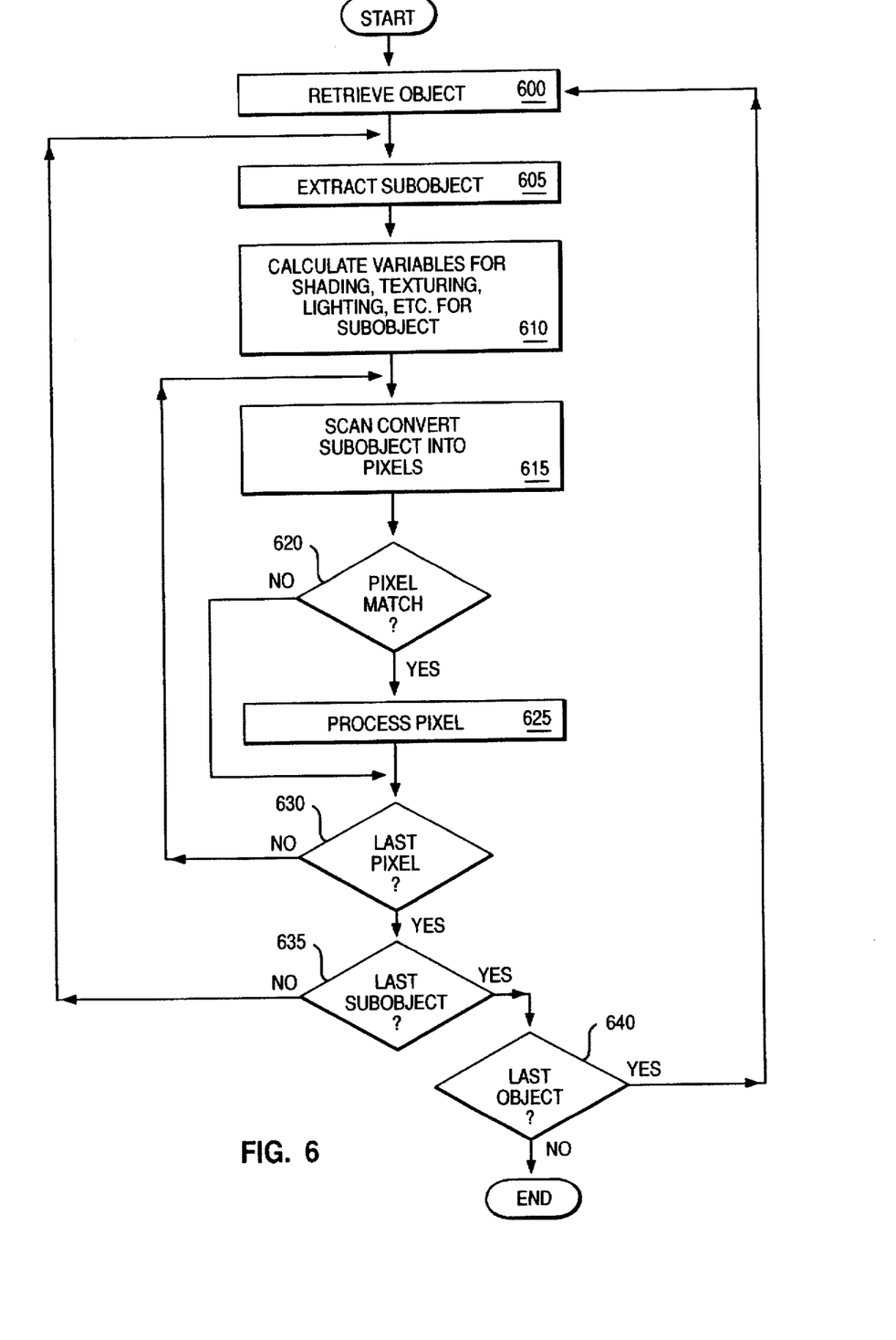
FIG. 6 is a flowchart illustrating a preferred method for each processor to handle the graphical workload while determining ownership of pixels or regions.

FIG. 6 is a flowchart illustrating a preferred method for each processor to handle the graphical workload while determining ownership of pixels or regions. This process may be executed concurrently and in parallel by all the processors.

In a first step 600, an object is retrieved for processing. The object retrieval may include comparing the bounding box for the object (previously determined and stored with the object in step 550 described above) to the regions that the processor owns if a region ownership list is utilized. Of course, other typical clipping techniques may be utilized.

Once retrieved, in step 605, the object may be split into subobjects as described above with reference to 540. Of course, other splitting techniques may be utilized in this step based on the type of graphical activities the processor is handling.

Once the subobject is extracted, then in step 610, various variables may be calculated for use in calculating colors, shading, textures, lighting, transparency, dithering, and other possible variables. The type of variables calculated may change depending on the types of graphical activities being performed by the processor.

In step 615, the subobject is then scan converted into pixels. In step 620, each pixel is checked to see if it is owned by the processor by comparing the identifier of the processor with the identifier stored in the pixel ownership buffer or the region ownership list for that pixel.

If yes in step 620, indicating that the processor owns this pixel, then the processor processes the pixel. This processing may include using the variables from step 610 and other known variables to calculate the color, lighting, transparency, etc. of that pixel. The calculated pixel values are then stored in the frame buffer for display. This process is typically known as rendering. Clearly, if a processor does not own a pixel, many computationally intensive calculations are avoided, thereby speeding up the rendering process.

If no in step 620 or if step 625 has been completed, then processing continues to step 630. In step 630, it is determined whether the last pixel for the subobject has been rendered. If no, then processing returns to step 615 for generating the next pixel for processing. If yes in step 630, then processing continues to step 635. In step 635, it is determined whether the last subobject for the object has been processed. If no, then processing returns to step 605 for generating the next subobject. If yes in step 635, then processing continues to step 640. In step 640, it is determined whether the last object has been processed. If no, then processing returns to step 600 for retrieving the next object. If yes in step 640, then processing ends for the processor until further objects are available for processing. It is at this time that the processor may reexecute the allocation process described in FIG. 5 above to reallocate some workload to the now idle processor.

The present invention has many advantages over the prior art. The present invention is very flexible and dynamic and allows optimization techniques to be used to optimize operation of the rendering. These optimization techniques may be applied in a predetermined fashion or they may be dynamically applied during runtime. The present invention may be optimized based on the current or planned workload of each processor, the number of processors, the number and location of objects on a display, as well as other measures of optimization.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for utilizing a plurality of processors to render graphical objects for display comprising:
    means for assigning selected processors, to predetermined pixels, wherein said means for assigning is in response to a current or a planned workload;
    means for storing in memory said assignment of said selected processors to said predetermined pixels;
    means for scan converting each received graphical object into pixels;
    means for dynamically modifying said assignment, to reassign said predetermined pixels to alternate processors so as to optimize the processors workload, wherein said reassignment is in response to said current or said planned workload; and
    wherein each processor includes means for rendering graphical object pixels only at pixel locations assigned to said processor according to said assignment stored in said memory.

2. The apparatus of claim 1 wherein said means for storing includes means for dynamically determining which pixel locations are to be assigned to each of said processors.

3. The apparatus of claim 2 further comprising means for providing to each processor graphical objects that intersect pixel locations assigned to said selected processors.

4. The apparatus of claim 3 wherein the means for scan converting includes each processor including means for scan converting graphical objects received by said processor into pixels.

5. The apparatus of claim 4 wherein the means for storing includes means for utilizing user input to dynamically determine which pixel locations are to be assigned to each of said processors.

6. The apparatus of claim 4 wherein the means for storing includes means for utilizing optimization techniques to dynamically determine which pixel locations are to be assigned to each of said processors.

7. A method of utilizing a plurality of processors to render graphical objects for display comprising the steps of:
    storing in memory assignments of pixel locations to a selected processor in response to a current or a planned workload;
    scan converting each received graphical object into pixels;
    dynamically modifying said assignments to reassign pixel locations to alternate processors so as to optimize the processors workload, wherein said reassignment is in response to a current or planned workload; and
    each processor rendering graphical object pixels only at pixel locations assigned to said processor according to said assignments stored in said memory.

8. The method of claim 7 wherein said step of storing includes dynamically determining which pixel locations are to be assigned to each of said processors.

9. The method of claim 8 further comprising the step of providing to each processor any graphical objects that intersect any pixel locations assigned to said processor.

10. The method of claim 9 wherein the step of scan converting includes each processor scan converting graphical objects received by said processor into pixels.

11. The method of claim 10 wherein the step of storing includes utilizing user input to dynamically determine which pixel locations are to be assigned to each of said processors.

12. The method of claim 10 wherein the step of storing includes utilizing optimization techniques to dynamically determine which pixel locations are to be assigned to each of said processors.

13. A data processing system comprising:
- a memory for storing data to be processed;
- a processing means for processing data stored in memory; and
- a graphics processing system utilizing a plurality of processors to render graphical objects received from said processing means comprising:
  - means for storing in memory assignments of pixel locations to a particular processor among said plurality of processors in response to a current or a planned workload;
  - means for scan converting each received graphical object into pixels;
  - means for dynamically modifying said assignments so as to optimize the processors' workload in response to a current or planned workload; and
  - wherein each processor includes means for rendering graphical object pixels only at pixel locations assigned to said processor according to said assignments stored in said memory.

14. The data processing system of claim 13 wherein said means for storing includes means for dynamically determining which pixel locations are to be assigned to each of said processors.

15. The data processing system of claim 14 wherein said graphics processing system further includes means for providing to each processor any graphical objects that intersect any pixel locations assigned to said processor.

16. The data processing system of claim 15 wherein the means for scan converting includes each processor including means for scan converting graphical objects received by said processor into pixels.

17. The data processing system of claim 16 wherein the means for storing includes means for utilizing user input to dynamically determine which pixel locations are to be assigned to each of said processors.

18. The data processing system of claim 16 wherein the means for storing includes means for utilizing optimization techniques to dynamically determine which pixel locations are to be assigned to each of said processors.

* * * * *